(12) United States Patent
Ambros

(10) Patent No.: US 7,959,393 B2
(45) Date of Patent: Jun. 14, 2011

(54) SCREW COMPRISING A THREAD-FORMING THREAD, BLANK FOR THE PRODUCTION OF SAID SCREW, AND SCREW CONNECTION

(75) Inventor: Olaf Ambros, Biblis (DE)

(73) Assignee: Baier & Michels GmbH & Co. KG, Ober-Ramstadt (DE)

( * ) Notice: Subject to any disclaimer, the term of this patent is extended or adjusted under 35 U.S.C. 154(b) by 139 days.

(21) Appl. No.: 12/071,811

(22) Filed: Feb. 26, 2008

(65) Prior Publication Data
US 2008/0206015 A1    Aug. 28, 2008

(30) Foreign Application Priority Data

Feb. 28, 2007 (DE) .................. 10 2007 010 221

(51) Int. Cl.
*F16B 25/00* (2006.01)
(52) U.S. Cl. ........................ 411/386; 411/426
(58) Field of Classification Search .................. 411/386, 411/387.4, 411, 424, 426
See application file for complete search history.

(56) References Cited

U.S. PATENT DOCUMENTS

| 2,993,950 | A | * | 7/1961 | Forman ................. 174/138 D |
| 4,255,959 | A | | 3/1981 | Muenchinger |
| 5,356,253 | A | * | 10/1994 | Whitesell ................ 411/188 |
| 5,395,195 | A | * | 3/1995 | Fulmer .................... 411/386 |
| 5,599,149 | A | * | 2/1997 | Clemente ................ 411/386 |
| 5,772,374 | A | * | 6/1998 | Ide et al. ................. 411/386 |
| 6,120,227 | A | * | 9/2000 | Murase et al. ........... 411/386 |
| 6,478,520 | B1 | * | 11/2002 | Sala ......................... 411/386 |

FOREIGN PATENT DOCUMENTS

| CA | 985463 | 3/1976 |
| DE | 1973200 | 11/1967 |
| DE | 8804654 | 9/1988 |
| DE | 19525733 | 1/1997 |

* cited by examiner

*Primary Examiner* — Gary Estremsky
(74) *Attorney, Agent, or Firm* — Dykema Gossett PLLC

(57) ABSTRACT

A screw for the creation of a metric thread in a female element, includes a load-bearing (metric) thread portion and a forming thread portion which is tapered to the tip of the screw. The flights of the tapered thread portion are sharp-edged and fully formed.

9 Claims, 5 Drawing Sheets

SCREW COMPRISING A THREAD-FORMING THREAD, BLANK FOR THE PRODUCTION OF SAID SCREW, AND SCREW CONNECTION

TECHNICAL FIELD

The invention relates to a screw comprising a thread-forming thread for creating a metric thread, which screw comprises a load-bearing thread portion and a thread-forming thread portion tapering to the screw tip, to a blank for the production of the screw, and to a screw connection comprising said screw.

PRIOR ART

The prior thread-forming screws have a screw tip with a continuously decreasing diameter and a cone angle, the thread being incompletely formed in the tapered portion.

The drawback of this is that in order to prevent the screw from slipping, large axial forces are required to start the screw to form the female thread in the female element.

SUMMARY OF THE INVENTION

The thread-forming screw of the invention, which, after having been driven into the component to be screw-connected, creates a metric thread in the latter, comprises a load-bearing thread portion and a thread-forming thread portion tapering to the screw tip, the flights of the tapered thread portion being continuously formed and sharp-edged. The thread can be fully formed right up to the tip and thus have full profile depth, and the thread crests show no gaps.

The blank of the invention comprises a shank to be provided with a thread and comprising a shank region tapering to the tip of the shank. Thus, when rolling the thread, a tapered fully formed thread having sharp-edged crests can be worked into the tapered region.

The screw connection of the invention comprises a self-forming screw and a female element comprising a hole for reception of the self-forming screw. The core hole diameter C in the female element is larger than the thread diameter A at the screw tip and smaller than the thread diameter B in the transition zone between a first sub-portion, which tapers from the metric portion, and a second sub-portion which adjoins the first sub-portion and tapers more steeply than the first sub-portion.

Additional embodiments of the invention are defined in the subclaims.

BRIEF DESCRIPTION OF THE DRAWINGS

The screw of the invention is explained below with reference to the drawings, in which.

DESCRIPTION OF EMBODIMENTS

Figure 1:
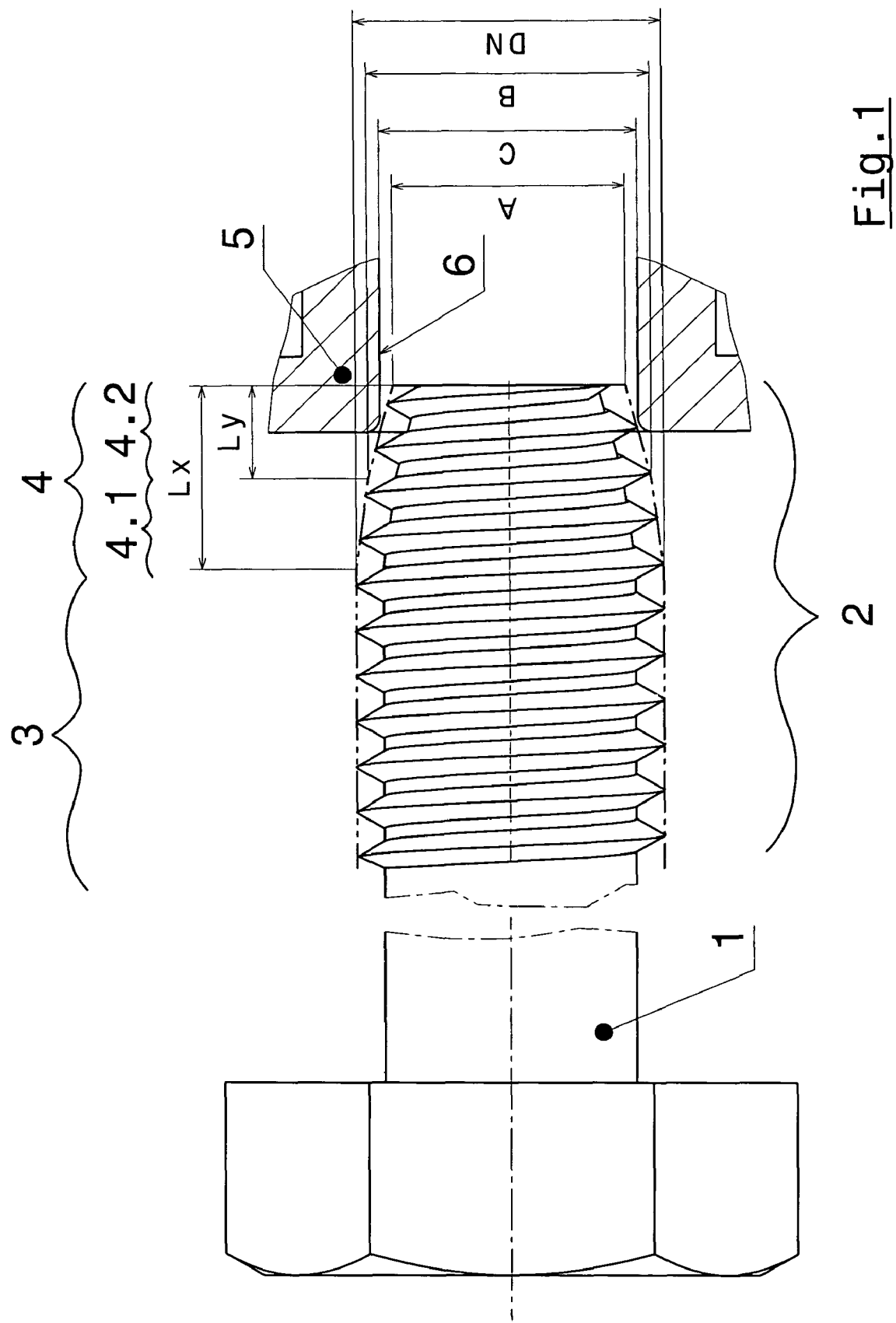
FIG. 1 shows the screw of the invention.

A screw 1 that includes a thread-forming thread 2 is shown in FIG. 1. The thread 2 comprises a cylindrical (load-bearing) thread portion 3 comprising a metric thread and a forming thread portion 4 tapering to the screw tip and having a length $L_x$ as measured from the screw tip. That part of the thread portion 4 of length $L_y$ is inserted into a component, referred to as the female element 5, which is to be screw-connected and which is provided with a hole 6. The thread portion 3 may be provided with non-cylindrical cross-sections, particularly a trilobular cross-section. But in that case, the favorable effect of a stepped cone when starting the screw and forming the female thread is achieved differently.

The flights of the tapered thread portion 4 are formed with sharp edges and they contribute to the formation of the female thread as soon as they engage in the female element 5.

The pitch of the thread in the tapered thread portion 4 is equal to that of the metric thread portion 3, but its diameter decreases continuously from the nominal thread diameter $D_N$ to a final diameter A.

The sharp-edged and fully formed thread makes it easier to start the screw 1 in the female element 5 and commence forming of the engaged female flight than when the thread crest is blunted.

Figure 3:
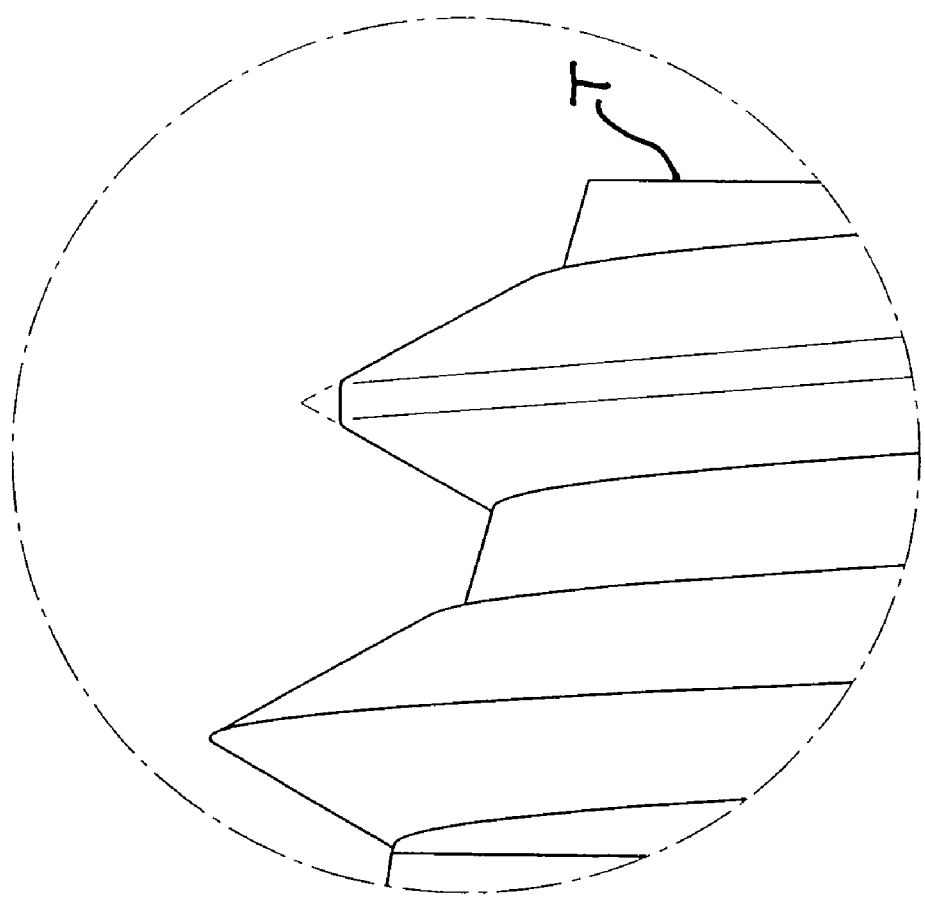
FIG. 3 shows a detail of a thread runout at the tip.

A thread runout, which is shown in FIG. 3 and which extends over not more than one flight, can be provided at the screw tip T pointing to the female element 5, the flight of the thread runout being at least partly blunted, for example by forming the flight incompletely.

The ratio of the length $L_x$ of the tapered thread portion 4 to the nominal thread diameter $D_N$ is from 0.6 to 1. This results in a ratio of the length $L_x$ to the pitch of from 4 to 5, preferably 4⅔.

The tapered thread portion 4 can be provided with a first sub-portion 4.1, which tapers from the straight thread portion 3, and a second sub-portion 4.2, which tapers more steeply from the first sub-portion 4.1 to the screw tip. This results in a transition zone at a distance $L_y$ from the screw tip, the diameter B in this transition zone having a value between that of the tip diameter A and that of the nominal thread diameter $D_N$.

The second sub-portion 4.2 can extend over a length $L_y$ that is from 0.4 to 0.5 times the total length $L_x$ of the tapered thread portion 4. A length $L_y$ equal to twice the pitch p, i.e. two complete flights, is particularly suitable.

A thread diameter A ranging from 0.6 to 0.8 times the nominal thread diameter $D_N$ of the straight thread portion 3 can be present at the end of the second sub-portion 4.2 and thus at the screw tip.

The thread diameter B in the transition zone between the first and second sub-portions 4.1, 4.2 can range from 1.2 to 1.5 times the diameter A at the screw tip, but the value of diameter B is always between the values of the tip diameter A and the nominal thread diameter DN.

The thread diameter B in the transition zone between the first and second sub-portions 4.1, 4.2 is larger than the diameter C of a core hole 6 which is provided in a female element 5 and in which a metric thread is to be formed as the female thread. The diameter C of the core hole is in a cylindrical part of the core hole 6.

The diameter C of the core hole is approximately equal to the flank diameter of the thread to be created.

The first sub-portion 4.1 is tapered at an angle alpha ranging from 5 to 10 degrees, and particularly 7.5 degrees, to the screw axis, and the second sub-portion is tapered at an angle beta of from 10 to 20 degrees, and particularly 15 degrees, to the screw axis.

Since only three to four flights are provided for forming the female thread, a taper formed by two cone angles is usually sufficient.

In the tapered thread portion 4, the thread of the screw can have a core diameter K which decreases continuously in relation to the basic core diameter $K_N$ of the cylindrical portion and which provides a taper equal, in particular, to the taper of the thread diameter. This results in a constant thread depth even in the case of a continuously decreasing core diameter.

Figure 2:
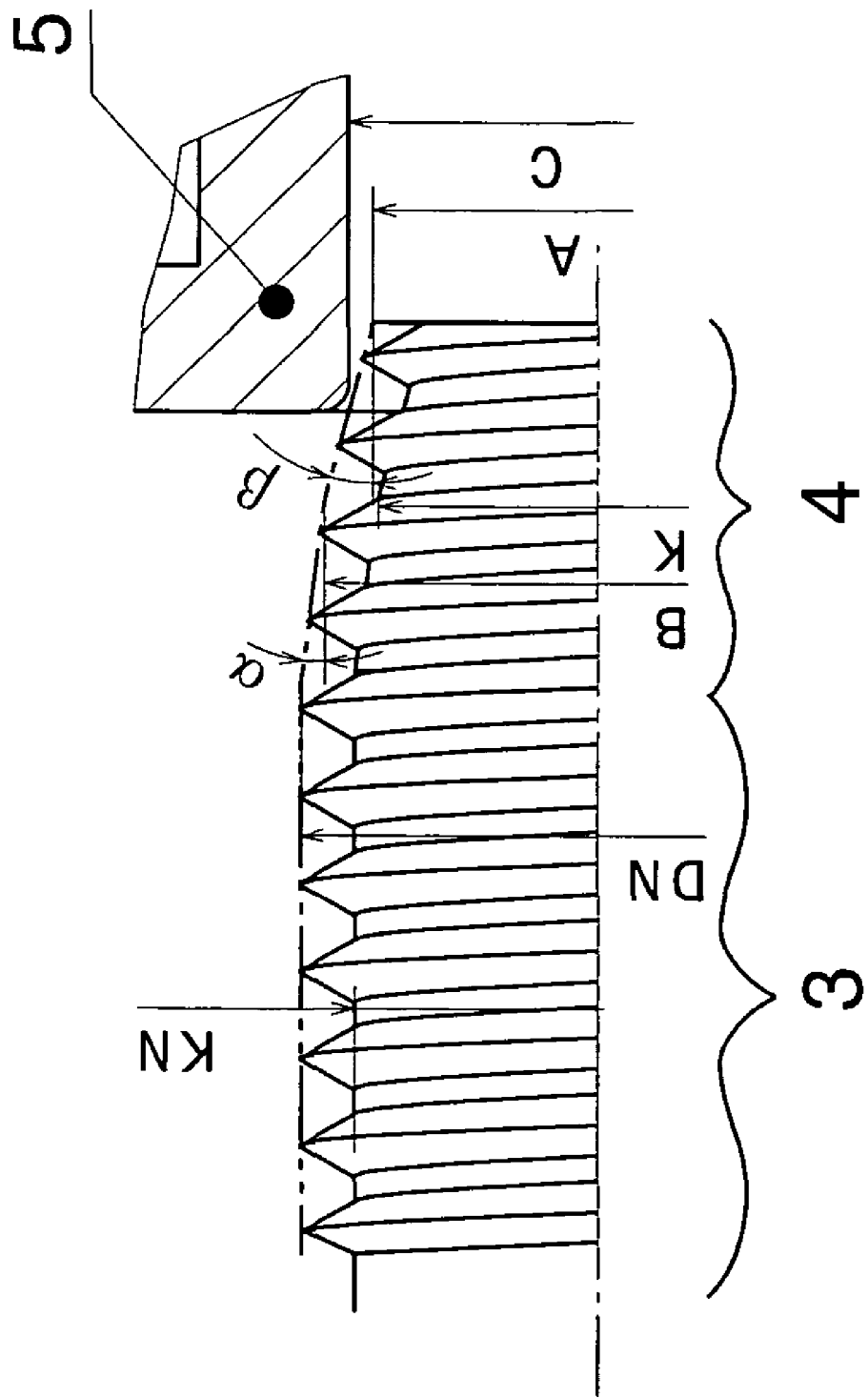
FIG. 2 shows details of the screw shown in FIG. 1.
Figure 4:
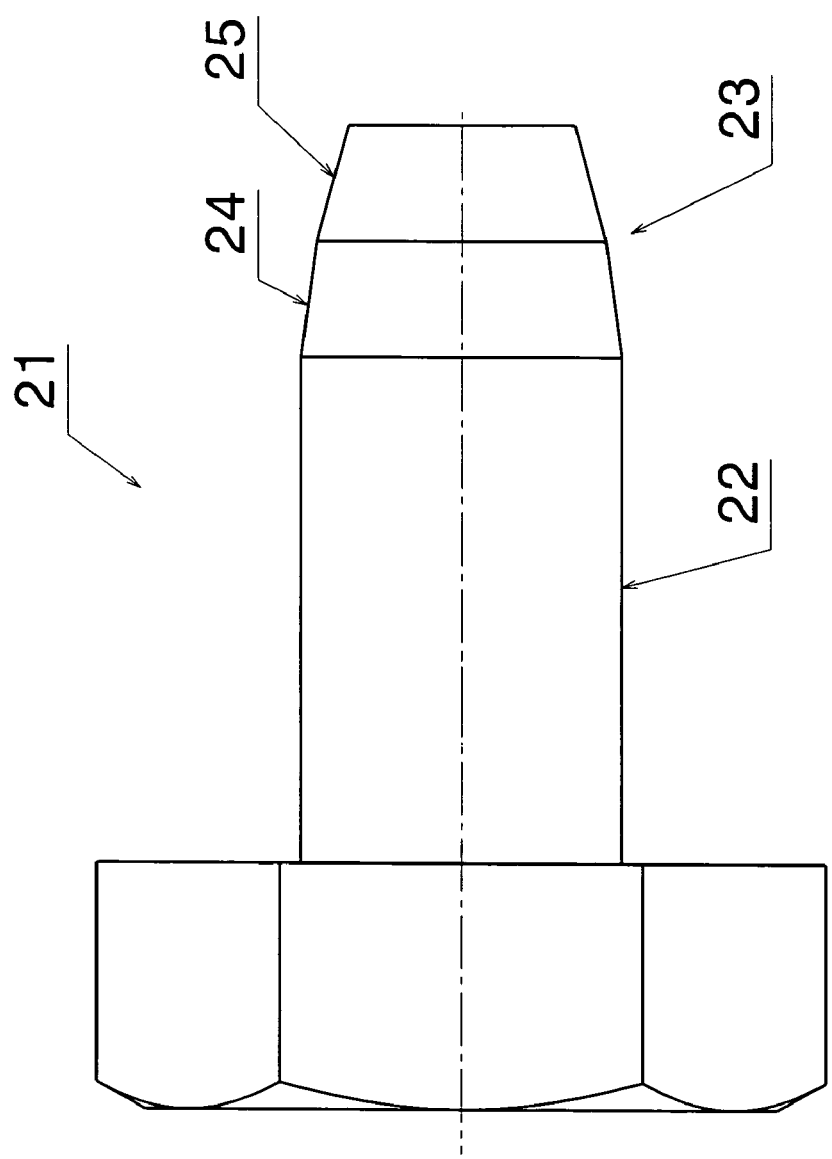
FIG. 4 shows a blank for the production of the screw shown in FIG. 1.

The screw shown in FIG. 1 and FIG. 2 may have been produced from a blank 21 shown in FIG. 4 by rolling. The blank 21 comprises a shank 22, which is to be provided with a thread and which comprises a shank region 23 tapering to the tip of the shank. This tapered shank region 23 can be divided into first and second subregions 24, 25, respectively. The first subregion 24 adjoins the non-tapered region of the shank 22 and the second subregion 25 adjoins the first subregion 24 and extends to the tip of the blank. Both subregions 24, 25 are formed conically, and the cone angle of the region extending to the tip of the blank is larger. Angles ranging from 7° to 20° for the first subregion 24 and from 10° to 40° for the second subregion 25 are suitable cone angles.

Figure 5:
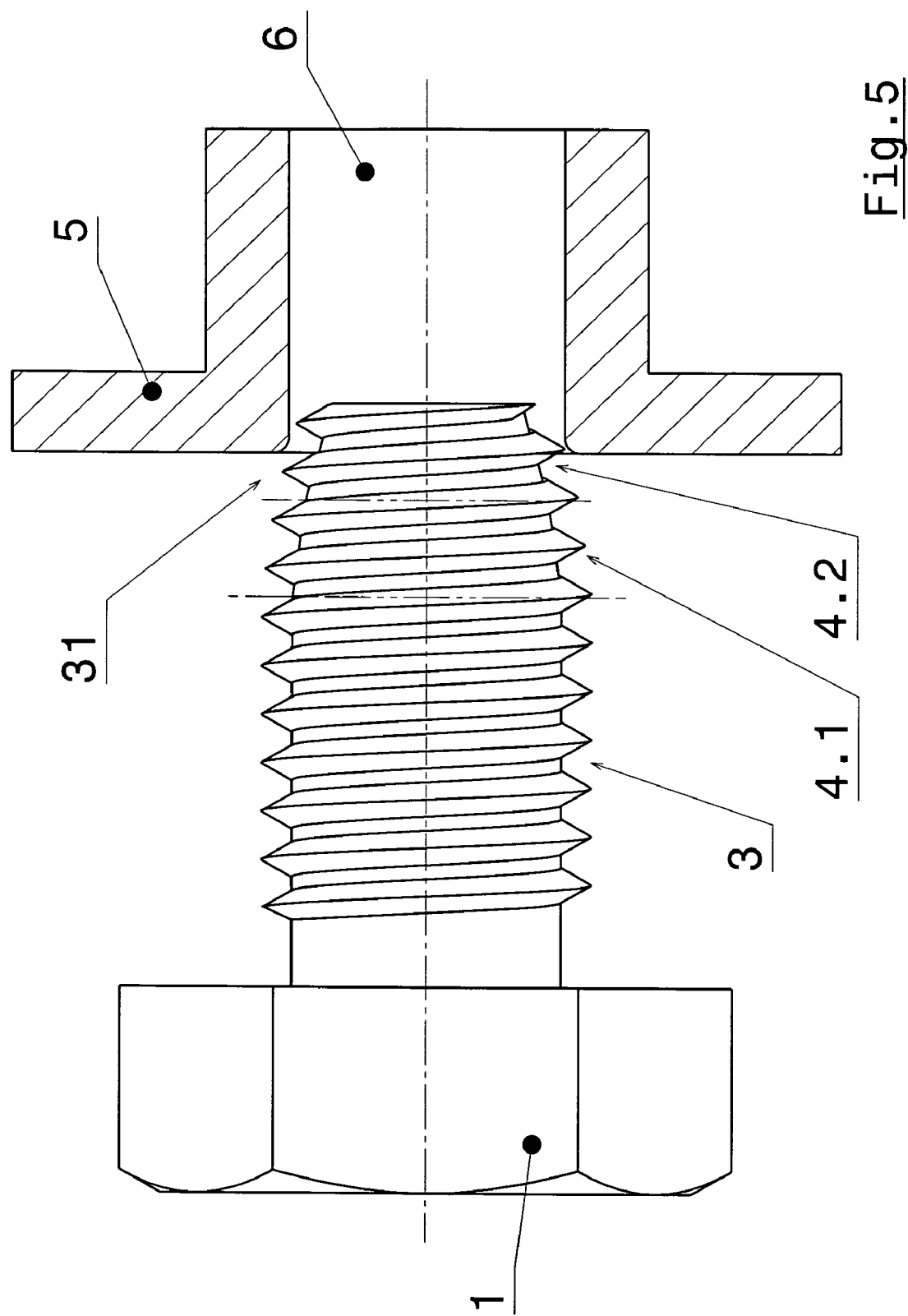
FIG. 5 shows a screw connection comprising the screw shown in FIG. 1 and a female element.

The screw connection 31 shown in FIG. 5 comprises the thread-forming screw 1 and a female element 5 as shown in FIG. 1 and comprising a hole 6 for reception of the screw. The core hole diameter C of the hole 6 in the female element 5 is larger than the diameter A of the screw tip, but smaller than the thread diameter B in the transition zone of a first sub-portion 4.1 tapering from the metric portion 3 and a second sub-portion 4.2, which adjoins the first sub-portion 4.1 and tapers more steeply than the first subregion 4.1 to the screw tip.

The screw 1 of the invention makes it possible to effect a rapid nonpositive engagement of the screw in the female element 5. Immediately after engagement of the thread, the axial forces arising during further tightening of the screw are substantially absorbed by the threaded part already formed in the female element 5 such that the screw-driving element need only produce radial forces for further formation of the thread and for subsequent screwing of the straight thread portion.

The advantage of a screw connection comprising a self-formed cylindrical thread over trilobular screws is that the thread is impermeable to gases and liquids, at least at low pressure differences.

The invention claimed is:

1. A screw having a thread-forming thread for creating a metric thread, comprising a load-bearing thread portion and a tapering forming thread portion which includes a first sub-portion tapering from said load-bearing thread portion and a second sub-portion tapering more steeply from said first sub-portion and extending to a screw tip, said second sub-portion extending over a length $L_y$ which is from 0.4 to 0.5 times a length $L_x$ of forming thread portion, said forming thread portion including sharp-edged and fully formed flights, and wherein thread depths in the forming thread portion are equal to thread depths in the load-bearing thread portion.

2. The screw according to claim 1, wherein the load-bearing thread portion is cylindrical and wherein a ratio of length $L_x$ of said forming thread portion to a nominal thread diameter $D_N$ of the load-bearing portion is from 0.6 to 1.

3. The screw according to claim 1, wherein at an end of said second sub-portion at said screw tip, the thread diameter A is from 0.6 to 0.8 times the nominal thread diameter $D_N$ of said load-bearing thread portion.

4. The screw according to claim 3, wherein in a transition zone between the first and second sub-portions the thread diameter B is from 1.2 to 1.5 times thread diameter A at the end of the screw tip.

5. The screw according to claim 4, wherein thread diameter B in the transition zone between the first and second sub-portions is intended to be larger than a core hole diameter C of a female thread corresponding to a metric thread to be formed.

6. The screw according to claim 5, wherein said tapered first sub-portion tapers at an angle (alpha) of from 5 to 10 degrees to an axis of the screw and said second sub-portion tapers an angle (beta) of from 10 to 20 degrees to the screw axis.

7. The screw according to claim 2, wherein in said forming thread portion, the screw defines a core diameter K which decreases continuously to conform to the taper of the tapered thread diameter.

8. The screw according to claim 7, wherein the load-bearing thread portion is cylindrical.

9. A screw connection, comprising a thread-forming screw according to claim 1 and a female element with a hole for reception of the thread-forming screw, said hole having a diameter C which larger than a thread diameter A at the screw tip but smaller than a thread diameter B in a transition zone between the load-bearing thread portion and the first tapered sub-portion.

* * * * *